US011102026B2

(12) United States Patent
Pognant

(10) Patent No.: US 11,102,026 B2
(45) Date of Patent: Aug. 24, 2021

(54) METHOD FOR CONFIGURING AND METHOD FOR CONTROLLING A HOME AUTOMATION APPARATUS

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 69 days.

(21) Appl. No.: 15/760,018

(22) PCT Filed: Sep. 14, 2016

(86) PCT No.: PCT/FR2016/052309
§ 371 (c)(1),
(2) Date: Mar. 14, 2018

(87) PCT Pub. No.: WO2017/046512
PCT Pub. Date: Mar. 23, 2017

(65) Prior Publication Data
US 2018/0270078 A1 Sep. 20, 2018

(30) Foreign Application Priority Data
Sep. 16, 2015 (FR) ...................................... 15/58667

(51) Int. Cl.
*H04L 12/28* (2006.01)
*H04L 12/24* (2006.01)

(52) U.S. Cl.
CPC ...... *H04L 12/2814* (2013.01); *H04L 12/2823* (2013.01); *H04L 41/044* (2013.01)

(58) Field of Classification Search
CPC ............ H04L 12/2814; H04L 12/2823; H04L 41/044
See application file for complete search history.

(56) References Cited

U.S. PATENT DOCUMENTS 6,192,282 B1 * 2/2001 Smith ..................... G05B 15/02
340/12.53
2004/0210652 A1 10/2004 Dyama et al.
(Continued)

FOREIGN PATENT DOCUMENTS

CN 101452483 A 6/2009
CN 101459559 A 6/2009
(Continued)

OTHER PUBLICATIONS

International Search Report for Application No. PCT/FR2016/052309.
(Continued)

*Primary Examiner* — Donald L Mills
(74) *Attorney, Agent, or Firm* — Cantor Colburn LLP

(57) ABSTRACT

The invention relates to a method for configuring a home automation apparatus including a plurality of home automation devices and a plurality of central control units (U1, U2). The method is executed by a management unit (Sv) connected to the at least one home automation apparatus and includes the following steps: receiving (ETCfSv1) a configuration message (MCf) from a user (Usr) or an application (A) that is executed on the management unit (Sv) or another connected management unit, determining (ETCfSv3) a list (UL) of central control units (U1, U2) capable of executing at least one condition (Cnd) and/or at least one action (AcU1, AcU2) of a conditional expression (CE), and sending (ETCfSv6) a configuration message (MCfU1, MCfU2), including a definition of a conditional software code module (CCM), to the at least one central control unit (U1, U2) included in the list (UL).

20 Claims, 6 Drawing Sheets

(56) References Cited

U.S. PATENT DOCUMENTS

| | | | | |
|---|---|---|---|---|
| 2009/0064192 A1* | 3/2009 | Betts | ................... | H04L 41/0853 |
| | | | | 719/318 |
| 2010/0102973 A1* | 4/2010 | Grohman | ........... | G05B 23/0272 |
| | | | | 340/584 |
| 2011/0228665 A1 | 9/2011 | Kumar et al. | | |
| 2014/0082177 A1* | 3/2014 | Lemire | ................... | F24F 11/30 |
| | | | | 709/224 |
| 2014/0095684 A1 | 4/2014 | Nonaka et al. | | |
| 2015/0304795 A1* | 10/2015 | Mignot | ................... | H04W 4/70 |
| | | | | 455/414.1 |
| 2018/0270075 A1* | 9/2018 | Cosserat | ............. | H04L 12/2807 |
| 2018/0287814 A1* | 10/2018 | Pognant | ................ | H04L 12/281 |
| 2018/0294989 A1* | 10/2018 | Cosserat | ................ | G08C 17/02 |

FOREIGN PATENT DOCUMENTS

| | | |
|---|---|---|
| CN | 101621406 A | 1/2010 |
| CN | 101995867 A | 3/2011 |
| CN | 104486416 | 4/2015 |
| EP | 1936510 A1 | 6/2008 |
| EP | 2252042 A2 | 11/2010 |
| EP | 2680496 A1 | 1/2014 |
| EP | 3235182 B1 | 3/2020 |

OTHER PUBLICATIONS

Written Opinion for Application No. PCT/FR2016/052309.
English Translation to First Office Action for Chinese Application No. 2016800667313.
First Office Action for Chinese Application No. 2016800667313.
First Search Report for Chinese Application No. 2016800667313.

\* cited by examiner

METHOD FOR CONFIGURING AND METHOD FOR CONTROLLING A HOME AUTOMATION APPARATUS

CROSS REFERENCE TO RELATED APPLICATIONS

This application is a National Stage of PCT Application No. PCT/FR2016/052309 filed on Sep. 14, 2016, which claims priority to French Patent Application No. 15/58667 filed on Sep. 16, 2015, the contents each of which are incorporated herein by reference thereto.

TECHNICAL FIELD

The present invention concerns a configuration method and a control method of a home automation installation.

BACKGROUND

A home automation installation of a building may comprise a plurality of home automation devices. It is known to proceed with the configuration, the control and/or the supervision of said installation using a central control unit which communicates with one or several home automation device(s).

In the case of large-size buildings, it may be necessary either to resort to repeaters, or to proceed with the installation of several central units in order to enable access to all the home automation devices belonging to the installation. Moreover, in the case of heterogeneous home automation installations, in which many types of home automation devices should be monitored, it may also be desirable to use several central control units which allow communicating in the different communication protocols used by the home automation devices.

While the presence of these different units allows communicating with all the devices, the architecture constituted accordingly is complex to master for a user.

The present invention aims to solve all or part of the aforementioned drawbacks.

BRIEF SUMMARY

To this end, the present invention concerns a configuration method of a home automation installation, comprising a plurality of home automation devices and a plurality of central control units; the method being executed by a management unit or by a mobile terminal connected to the home automation installation and comprising the following steps:

i. Reception of a configuration message originating from a user or from an application being executed on the management unit or on another connected management unit, the message comprising a definition of a conditional expression defining:

an evaluation of at least one condition covering:
at least one state variable of at least one home automation device and/or
at least one time or one date;
and
a conditional triggering of at least one action;

ii. Determination of a list comprising at least one central control unit capable of:
evaluating the at least one condition and/or
triggering the at least one action;

iii. Generation of at least one conditional software code module enabling, during its execution by the at least one central control unit comprised in the list, the evaluation of the at least one condition and/or the triggering of the at least one action;

iv. Sending at least one configuration message comprising a definition of the at least one conditional software code module to the at least one central control unit comprised in the list.

By action, is may be understood the execution of at least one command defined optionally in the conditional expression; or still the triggering of a scenario or a group of commands communicated beforehand to the central control unit and identified by an identifier of the command group or scenario; in this case, the action element of the conditional expression contains this identifier.

The triggering of the action may be direct by the central control unit, or indirect, by sending a notification or control message to the management unit or another central control unit.

Scenario means a set of commands comprising at least one command intended to at least one home automation device, said set being saved beforehand in at least one central control unit, the scenario may be triggered based on a command of the user, an event triggered by the realization of a condition, the time and/or the date, or still a condition on a state variable of a home automation device which may in particular consist of a sensor measurement or a state variable of a home automation device. A scenario may be identified by a scenario identifier.

Grouped command or command group means a set of commands comprising a plurality of commands intended to one or several home automation device(s), the plurality of commands being intended to be sent to at least one central control unit for execution on reception.

All the conditional software code modules may be evaluated on the server side because the server has insight over all the values of the state variables, the information regarding the change of the value of these variables being communicated by the central control units. Moreover, the server can manage the necessary time counters.

Nonetheless, in many cases, it is possible to distribute the treatments over one or several central control unit(s) of an installation so as to economize the computing resources on the server side, these treatments including:

The need to re-evaluate conditions when a state variable value changes;

The need to maintain time counters executed for various time-based conditions.

Considering a wide base of users, the resources in terms of processing time and memory on the management unit for managing the conditional software code modules in real-time become significant.

The arrangements according to the invention enable a significant reduction of these resources by specific arrangements on the management of the conditional software code modules and their distribution.

A conditional expression is considered to be distributed as soon as it covers several elements of a system, the elements being constituted by central control units or a server/a management unit:

Either the condition of the conditional expression depends on state variables relating to home automation devices which are managed by multiple independent central control units;

Or the actions of the conditional expression cover multiple home automation devices related to multiples central control units;

Or the condition depends on at least one state variable relating to at least one home automation device related to at least one first central control unit and the at least one action of the conditional expression concerns at least one other home automation device related to another electronic control unit.

A conditional software code module is generated for each central control unit included in a list, each module being arranged to carry out the evaluation of the portion of the conditional expression assigned to the central control unit and optionally to emit at least one notification to the management unit and/or another central control unit.

During the step of sending a configuration message, a propagation of the definition of the conditional expression is carried out.

This propagation may comprise a partition of the elements of the conditional expression, the elements of the conditional expression being the at least one condition, and the at least one action, over the selected central units. Thus, each central unit may receive only but a portion of the elements of the expression in the form of a conditional software code module, the linkage between these different distributed elements being ensured by the management unit which receives notifications from the central control units executing the elements and sends back an action message to the unit that should execute the next element of the module.

According to an aspect of the invention, saving the conditional software code module is carried out on the management unit in connection with an identifier of the installation or of an entity representative of the installation.

Thanks to the arrangements of the invention, it is possible to use conditional expressions involving several central control units within the same installation in order to extend the number of home automation devices which can be monitored by one single conditional expression.

It should be noted that by home automation device is meant a home automation equipment and/or a sensor, or a portion of a home automation equipment or a portion of a sensor corresponding to a functional subset.

Moreover, by message is meant an information element notified or received via a communication module from external equipment, or in the form of a synchronous or asynchronous call, which may also correspond to a local or remote function call.

Installation means a set comprising a plurality of home automation devices and a plurality of central control units disposed within one single building or on a plurality of locations, each home automation device being linked to a central control unit among the plurality of central control units, the plurality of central control units forming a group under the control of one user. The electronic devices form groups of at least one home automation device related to a central control unit.

The same device or the same control unit may belong to at least two different installations, possibly under the responsibility of at least two different users. As example, a home automation device corresponding to a heating system may be comprised in a first home automation installation comprising a set of devices comprised within a dwelling, under the control of one user occupying the dwelling, and in a second home automation installation comprising a set of home automation devices corresponding to heating systems disposed within a plurality of dwellings under the control of one user administrator of the heating equipment for the plurality of dwellings.

Central control unit of the home automation installation means an electronic unit comprising at least one processing unit for containing and executing at least one computer program, comprising at least one communication module intended for the monitoring and/or control of at least one home automation device or an electronic unit integrated to a home automation device and at least one module for communication with the management unit. In some applications, a central control unit can communicate with the management unit through an intermediate management unit, for example a third-party service provider, whose intermediate management unit provides a service interface or API.

According to an aspect of the invention, the management unit is a server remotely connected to the at least one home automation installation, via a wide area network.

According to another aspect of the invention, the management unit is a central unit intended to be linked to one or several central control unit(s) on distinct private or local area networks, or on the same local area network.

According to an aspect of the invention, the third-party application may be executed, as the case may be, on the user terminal or on the management unit or still on another management unit connected to the user terminal or to the management unit executing the control method.

According to an aspect of the invention, the home automation installation is represented by a representative entity associated to a group of home automation devices corresponding to the plurality of home automation devices belonging to the installation.

Thanks to these arrangements, the interface presented to the user may thus add an abstraction layer to hide the actual attachment of the devices to the central control units. Thus, the interface represents the home automation equipments, such as the shutters, awnings, HVAC or lighting systems, pilotable within the installation as well as the present sensors.

These arrangements are obtained without any communication between the central control units, but simply by the logical attachment performed during the configuration.

According to an aspect of the invention, the representative entity is associated to a group of central control units corresponding to the plurality of central control units belonging to the installation.

According to an aspect of the invention, the method further comprises a step of saving the conditional expression in connection with a conditional expression identifier, and the step of sending the at least one configuration message comprising the definition of the at least one conditional software code module is executed in connection with the conditional expression identifier.

Conditional expression identifier means an identification element allowing establishing a linkage between a software code module and a conditional expression. It is possible to use a unique identifier or a multiple identifier, for example one identifier per software code module, all the identifiers being saved.

According to an aspect of the invention, the management unit determines that a central control unit is capable of evaluating the at least one condition or of executing the at least one action if:

At least one of the state variables of one of the home automation devices related to said central control unit is used in the condition; or At least one of the home automation devices related to said central control unit is used in the at least one action.

According to an aspect of the invention, the method further comprises a step of determining a support level provided by the at least one central control unit for a type of the conditional software code module; and the generation of the at least one conditional software code module is performed based on the support level.

According to an aspect of the invention, the central control units may have different support levels for the types of conditional expressions:

A full support of the conditional expression: evaluation of the conditions Cnd and triggering of the actions;

A full support for the evaluation of the conditions;

A support for the evaluation of the conditions based on the state variables values alone;

A support for the evaluation of the temporal conditions alone;

A support for the execution of the actions alone;

A support for sending notification messages to the management unit, indicating that the condition is met;

A support for sending control or notification messages to other central control units, capable of executing actions. According to one possibility, these messages and their addressees may be defined by the management unit during the step of generating the software code module. In this case, the central control unit sending the control or notification message triggers the action without needing to know the attachment of the home automation devices or the action to execute;

No support at all.

The present invention also concerns a configuration method of a home automation installation, comprising a plurality of home automation devices and a plurality of central control units; the method being executed by the at least one central control unit and comprising the following steps:

i. Reception of a configuration message originating from a management unit or from a mobile terminal connected to the home automation installation, the configuration message comprising a definition of a conditional software code module enabling during its execution:

an evaluation of at least one condition covering at least one state variable of at least one home automation device related to the at least one central control unit and or at least one time or one date;

and/or a conditional triggering of at least one action;

ii. Saving the conditional software code module;

iii. Configuration of the central control unit so as to:

evaluate the at least one condition; and/or trigger the at least one action when the at least one condition is validated subsequently to the evaluation.

According to an aspect of the invention, the at least one control unit is configured so as to send a notification message to the management unit or the mobile terminal indicating that the at least one condition of the conditional software code module CCM has been validated and/or that the action(s) have been triggered.

According to an aspect of the invention, the configuration method is executed by a first central control unit, and the configuration message comprises:

a definition of at least one notification or control message; and at least one identifier of a second central control unit of the home automation installation, and the first central control unit is configured so as to send the notification or control message to the second central control unit, when the at least one condition has been validated.

The present invention also concerns a control method of a home automation installation, the home automation installation comprising a plurality of home automation devices, and a plurality of central control units; the method being executed by a central control unit, based on a conditional software code module saved beforehand, the conditional software code module defining:

an evaluation of at least one condition covering:

at least one state variable of at least one home automation device related to the at least one central control unit and/or at least one time or one date and/or a conditional triggering of at least one action;

the method comprising the following steps:

i. Evaluation of the at least one condition; and/or ii. Execution of the at least one action defined by the conditional software code module.

According to an aspect of the invention, in the case where the central control unit receives a conditional software code module concerning the action alone, the triggering of this action may be achieved without the knowledge by the concerned unit of the evaluation of the condition. The triggering is carried out by the reference to the conditional expression identifier.

According to an aspect of the invention, the conditional software code module is saved beforehand in connection with a conditional expression identifier; and further comprises a step of sending a notification message to a management unit indicating that the at least one condition of the conditional software code module has been validated during its evaluation and/or that the at least one action has been executed, in connection with the conditional expression identifier.

According to an aspect of the invention, a first central control unit has been configured beforehand to carry out the evaluation of the at least one condition, the method further comprising a step of sending a notification or control message to a second central control unit of the installation by the first central control unit, when the at least one condition has been validated by the first central control unit.

According to an aspect of the invention, the notification message contains instructions for the execution of an action for a device related to the second central control unit, on reception of a notification message indicating that the condition Cnd is validated.

According to another aspect of the invention, the notification message comprises a state variable value.

According to another aspect of the invention, the notification or control message comprises an explicit command to the second central control unit.

The present invention also concerns a control method of a home automation installation, the home automation installation comprising a plurality of home automation devices, and a plurality of central control units; the method being executed by a management unit or by a terminal connected to the at least one home automation installation, based on a conditional expression defining an evaluation of at least one condition covering at least one state variable of at least one home automation device and/or at least one time or one date and a conditional triggering of at least one action and comprising the following steps:

i. Reception of a notification message originating from an emitter central control unit indicating that the at least one condition of the conditional expression has been validated and/or that the at least one action has been executed;

ii. Identification of a complete definition of the conditional expression;

iii. Determination of a selection of central control units involved in the at least one action of the conditional expression;

iv. Sending at least one action message to at least one central control unit comprised in the selection for triggering an action on a home automation device related to said central control unit.

According to an aspect of the invention, during the step iii, the central control unit emitter of the notification message is excluded from the selection.

According to an aspect of the invention, in the case of a conditional software code module which would be only time-based, during the step iii, only the central units which have no support for the time-based conditional software code modules are kept in the selection.

According to an aspect of the invention, the notification message received at step i provides an identifier of the conditional expression; and the complete definition of the conditional expression is stored beforehand in connection with the identifier, the identification of a complete definition of the conditional expression may be carried out thanks to the identifier of the conditional expression provided in the notification message.

According to an aspect of the invention, the action message sent at step iv comprises the identifier of the conditional expression, the method further comprising the following step:

Determination of a result of the at least one action, by aggregating a plurality of notifications received in a plurality of received notification messages, based on the unique identifier of the conditional expression.

According to an aspect of the invention, the result may be communicated or consulted by a user or by a third-party application in a subsequent step.

According to an aspect of the invention, it is possible for example for the unit executing the evaluation of the conditional expression to adjoin an execution identifier to the unique identifier of the conditional software code module in order to differentiate the different executions of this module, this execution identifier being propagated to the other concerned units in the notification or action messages.

The present invention also concerns a computer program product comprising code instructions arranged to implement the steps of a method as previously described, when said program is executed by a processor of a management unit or of a central control unit.

The present invention also concerns a system comprising a management unit or a mobile terminal arranged to execute the method as previously described, connected to at least one central control unit of a home automation installation, the at least one central control unit being arranged to execute the method as previously described.

The different non-incompatibles aspects defined hereinabove may be combined.

BRIEF DESCRIPTION OF THE DRAWINGS

The invention will be better understood from the detailed description which is exposed hereinafter with reference to the appended drawing in which.

DETAILED DESCRIPTION

In the following detailed description of the figures defined hereinabove, the same elements or the elements filling identical functions may preserve the same references so as to simplify the understanding of the invention.

Figure 1:
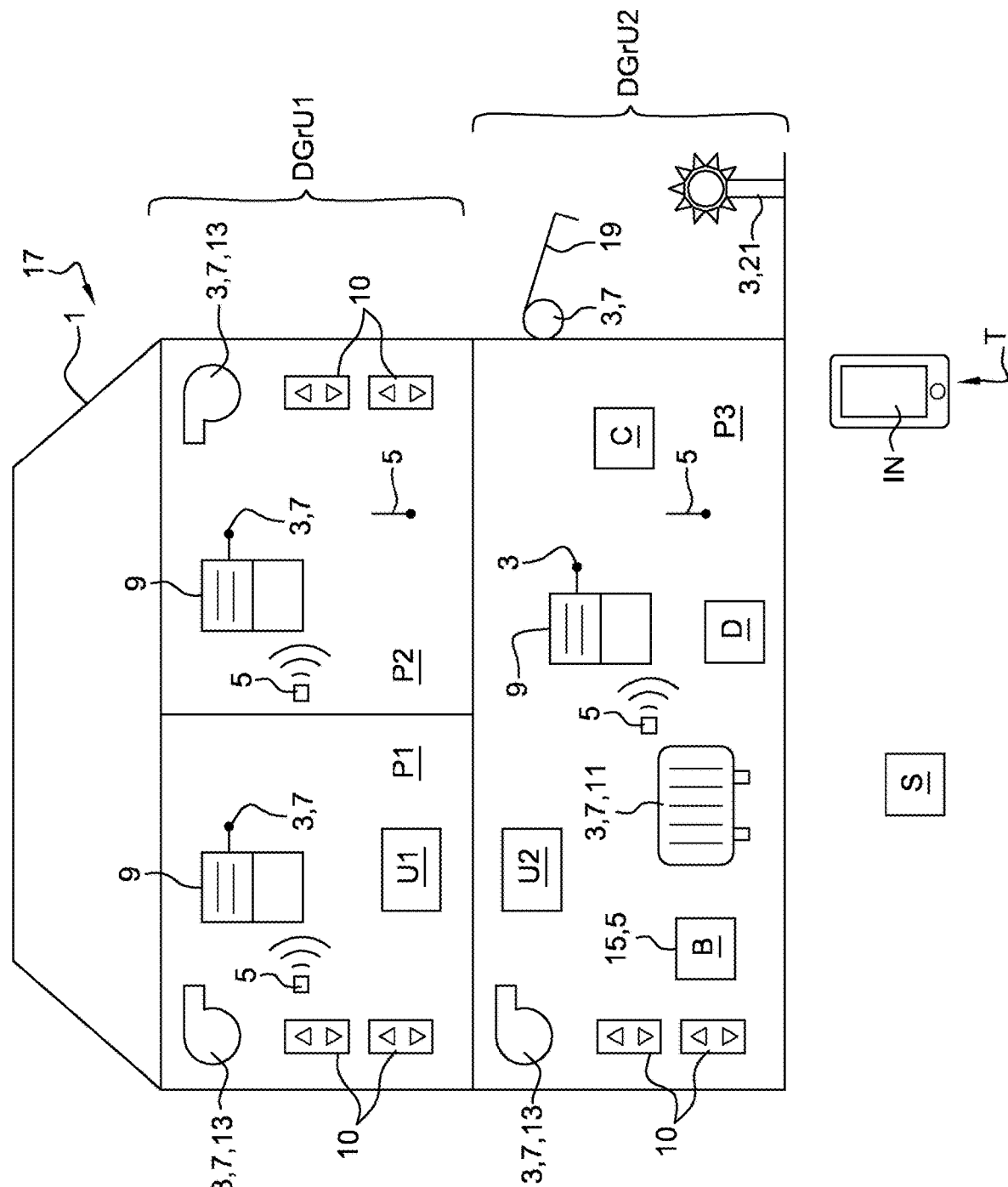
FIG. 1 is a schematic view of a building and of a home automation installation in accordance with an embodiment of the invention.

As illustrated in FIG. 1, a building 1 comprises for example three rooms P1, P2, P3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. Home automation equipment 3 may also consist of a lighting, for example a terrace external lighting 21 or a lighting control system, an alarm system, or still a video camera, in particular a video-surveillance camera.

The home automation installation 17 may also comprise a control point 15 an actuator 7, such as a wireless control box B for the rolling shutter 9.

The home automation installation 17 may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipments 3 of the building 1, such as, for example, sensors of the open state of a rolling shutter 9 or sensors of the position of a door leaf such as a window, whether motorized or not, may also be provided. The home automation installation may also comprise one or several presence sensor(s).

A home automation equipment 3 and a sensor 5 should thus be considered as units having information on observed actual states of elements of the building 1 and being capable of sharing this information with other elements of the home automation installation 17.

The home automation equipment 3 and the sensors 5 can thus have access to any measurable physical unit, such as the temperature of each room P1, P2, P3 or a state of an element of the building 1, such as the open state of a rolling shutter 9, the state of an alarm, etc.

In the following, we will use the home automation device or device D designation indifferently to designate sensors or home automation equipment, or parts of home automation equipments 3 or sensors 5.

The home automation installation 17 comprises a plurality of central control units U1, U2. In particular and as example, two central control units U1, U2 are represented in FIG. 1.

Each central control unit U1, U2 is arranged to control and/or monitoring part of the devices D of the installation 17 forming a group DGrU1, DGrU2. As example, in FIG. 1, the central control unit U1 is in charge of the devices D disposed in the rooms P1 and P2 of the first floor of the building, whereas the central control unit U2 is in charge of the devices D disposed in the room P3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

The devices D parts of a group DGrU1, DGrU2 belong to a local area network managed by a central control unit U1 or U2 within the home automation installation and communicate according to a local communication protocol with the central control unit U1 or U2. They have a local address in this network. The logical devices D may be modeled as nodes or end points in the local area network.

The local addressing system may be hierarchical or flat, the address format may be numeric or alphanumeric.

Figure 2:
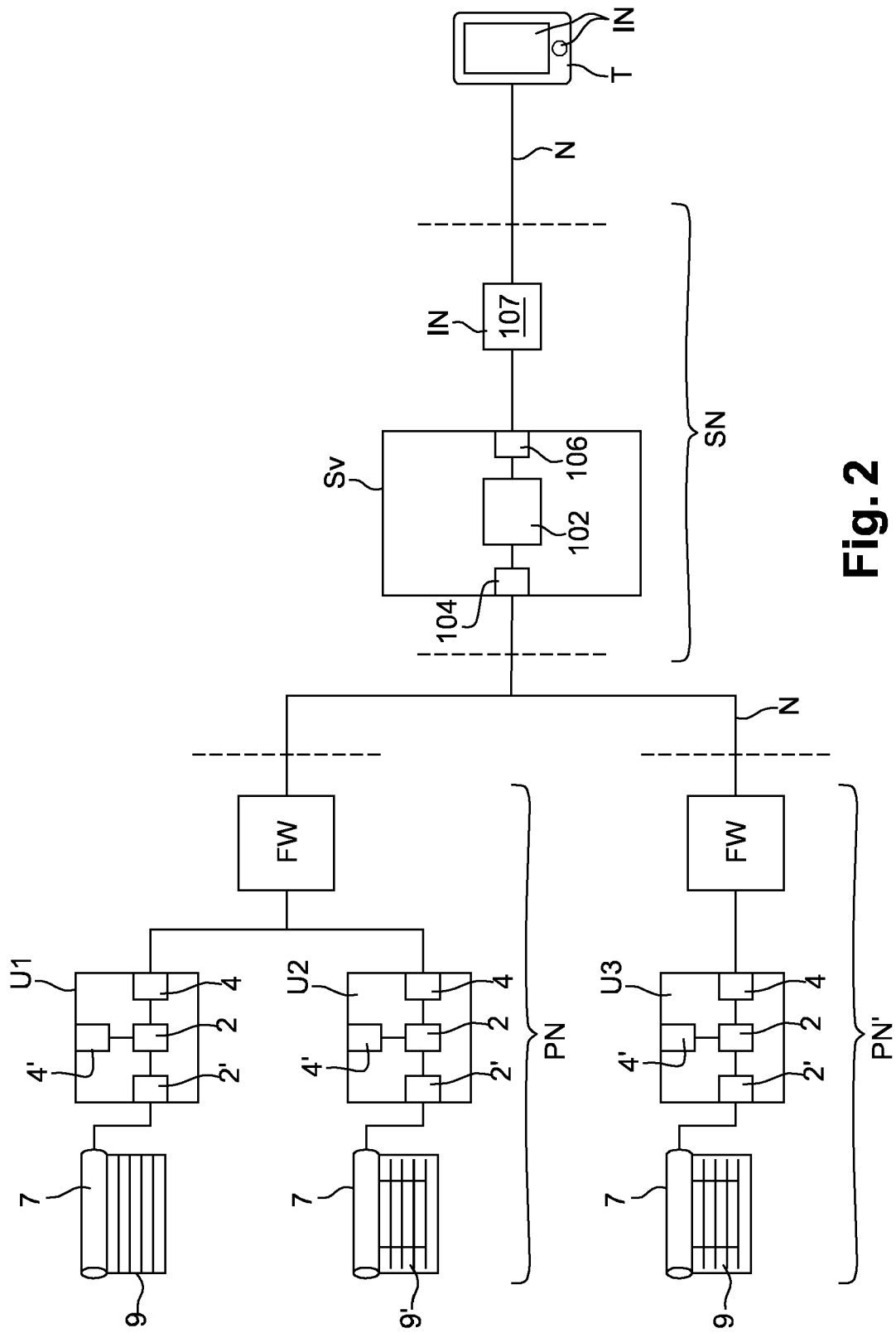
FIG. 2 is a diagram presenting architecture of a system comprising the home automation installation illustrated in FIG. 1 as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, whereas a third central control unit U3 is disposed on a second private network PN', independent of the private network PN corresponding to a second home automation installation. The server Sv is also disposed on a private network SN. The private network PN is linked to a wide area network N, for example the Internet. Of course, the server Sv is arranged to communicate with a set of such central control units U. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended to monitoring and/or control home automation equipments 3 and/or sensors 5, the home automation equipments 3 may consist of actuators 7, lightings 21, an alarm system, or a video camera.

As example, as represented in FIG. 2, the communication module 2' enables the monitoring and/or control of at least one actuator 7, a movable element of the building 1, such as for example a rolling shutter 9, or an orientable sunshade 9' or other actuators 7 or lightings 21, as previously described with reference to FIG. 1.

As example, the communication module 2' may be arranged to implement for example one or several of the protocols Z-Wave, EnOcean, IO-Homecontrol, Somfy RTS, KNX, MODBUS, Wavenis, Philips HUE.

According to another possibility, for example in the context of alarm systems, the central control unit may be integrated into the home automation device.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U further comprises a module 4 for communicating with the server Sv. The server Sv enables the remote control and/or monitoring and comprises one or several processing unit(s) 102 arranged to contain and execute a second computer program.

Each central control unit U further comprises a communication module 4' to communicate according to a local communication protocol, for example Bluetooth, Zigbee or Wifi, with a mobile communication terminal T. The communication terminal T may contain and execute an application software APP.

In some applications, a central control unit U may communicate with the management unit through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling a user to remotely control the home automation installation.

It should be noted that the term server is a logical designation which may cover the use of several physical servers to distribute the computer processing load to carry out.

For example, the control and/or monitoring interface IN comprises a web server 107 and a mobile communication terminal T communicating via the wide area network N. For example, the mobile communication terminal T may consist of a Smartphone or a tablet. The mobile communication terminal T may be the same or a terminal of the same type as that with which the central control unit U communicates locally by means of the communication module 4', or a different terminal. We will designate these mobile terminals indifferently by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

FIGS. 1 and 2 describe an installation 17 which comprises a set of devices D and a plurality of central control units U1, U2, disposed within the same dwelling, the same building or the same physical location.

According to another possibility, an installation 17 in the context of the invention may comprise home automation devices disposed on a plurality of locations, with at least one central control unit on each one of these locations to which are related the home automation devices, the central control units U of the installation being placed under the control of one user.

As example, such an installation may comprise a set of home automation devices constituted by heating systems distributed within a set of dwellings or tertiary premises, related to a set of central control units U, the set of home automation devices being intended to be controlled by a specific user in charge of heating for said set of dwellings or tertiary premises.

Figure 3:
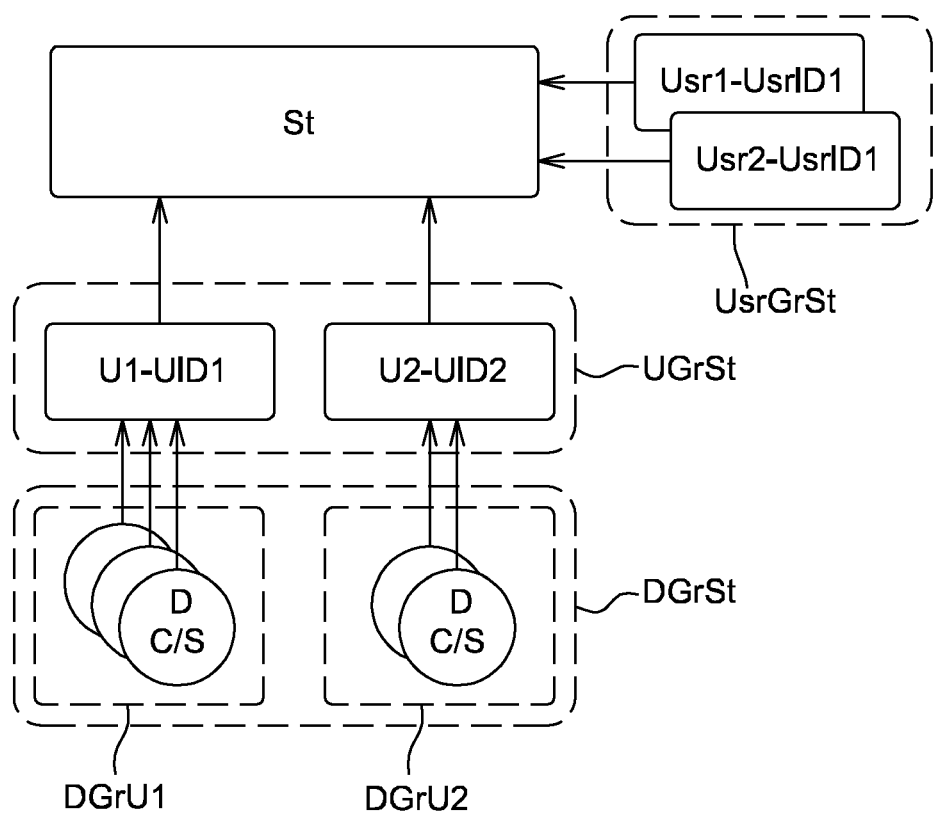
FIG. 3 is a diagram representing the relationships between an entity representative of a home automation installation, the central control units and the devices of the home automation installation.

We will now describe, with reference to FIG. 3, the representation of the installation 17 by a representative entity St on the server Sv, in the case where the installation comprises multiple central control units U.

The system according to the invention relates several central control units U to one single object St representing an installation 17 by a configuration at the level of the server Sv.

Thus, the server Sv may present to the user the installation 17 as one single set of devices D, for example via an Application Programming Interface or API, in which each device D may accept a given set of commands C or present state variables S.

The server Sv may also use an abstraction system or layer for the commands C and the state variables S in order to propose an API more generic and independent of the communication protocol used by a given device D.

The identification of the representative entity St of the installation may be according to an embodiment carried out by any one of the identifiers UID of any of the central control units U present within the installation, by an identifier of the installation or of the user.

Thus, in order to simplify the designation of an installation in the public APIs, all it needs is that the users of these APIs provide a unique identifier related to the representative entity St of the installation 17.

Internally to the server, a unique identifier of the representative entity St of the installation 17 may exist in order to facilitate the implementation.

Thus, the representative entity St may be associated to a list or group of devices DGrSt grouping together the devices contained in the different groups DGrU1, DGrU2 related to each central control unit U1, U2, and to a group UGrSt of the identifiers UID of the concerned central control units U. The devices are identified by a unique identifier. A representative entity of the home automation installation may be associated with a given user Usr1, identified by an identifier UsrID, corresponding for example to a login and password combination or with a given group of users UsrGrSt.

An example of an embodiment of a unique identifier of a device DURL will now be described.

According to this embodiment, the unique identifier of a device DURL comprises information on:

The local native protocol of the home automation device D;

The communication path to the device D, including the intermediate central control units U and the termination addresses to cross, whether organized or not in a hierarchical topology;

A subsystem identifier subsystemId if the device comprises several functional subsets or subsystems which may be addressed separately. The devices which comprise only but one functional set have no extension for identifying a subsystem.

Thus, the form of the unique identifier of a device DURL may be as follows:

<protocol>://<gatewayId>rawDeviceAddress>(#<subsystemId>)

Wherein the following fields are present:
protocol: identifier of the native device local protocol.
gatewayId: identifier of the first central control unit U, for example a serial number or a unique identifier.

rawDeviceAddress: a simple or multi-level path. The meaning and format thereof depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier of a device DURL corresponds to a device D communicating by the KNX protocol with an individual address 1.1.3 accessible to the central control unit U carrying the identifier #0201-0001-1234.

2) io://0201-0001-1234/145036#2

This unique identifier of a device DURL corresponds to a subsystem carrying the number 2 associated to a device D communicating by the io-Homecontrol protocol with a radio address 145036 accessible to the central control unit U carrying the identifier #0201-0001-1234.

The handling of the data relating to the devices D at the level of the server Sv are carried out by an execution process or service ES. In order to store the data relating to the different above-mentioned device instances D, the execution service may have access to an instances database IDB. Of course, these different instances types may also be stored in a separate manner. Moreover, by database, is herein meant an appropriate storage method for a set of instances, which may be memorized in a list, a tree or tables or any other appropriate data structure.

More particularly, the present invention concerns the consideration of distributed conditional expression CE.

A conditional expression CE defines:
at least one evaluation of a condition Cnd covering at least one state variable S of at least one home automation device D and/or the time and/or the date, and
at least one conditional triggering of at least one action Ac.

By action Ac, is may be understood the execution of at least one command C defined optionally in the conditional expression CE; or still the triggering of a scenario Sc or a group of commands C communicated beforehand to the central control unit U and identified by an identifier of the command group or scenario.

A conditional expression CE is considered to be distributed as soon as it covers several elements of a system, the elements being constituted by central control units or a server/a management unit:

Either the condition Cnd depends on state variables S relating to home automation devices D which are managed by multiple independent central control units U;

Or the actions Ac cover multiple home automation devices D related to multiples central control units U;

Or the condition Cnd depends on at least one state variable S relating to at least one home automation device D related to at least one first central control unit U1 and the effects/actions concern at least one other home automation device related to another electronic control unit U2.

Different types of conditional expressions CE may be considered.

A first type corresponds to a temporal conditional expression CE, the corresponding condition may be checked only once, or in a recurrent manner. As example, a condition being met only once may correspond to an instruction of the type «execute in 15 minutes». As example, a recurrent condition may correspond to a condition of the type «execute every Monday at 8.00 am».

A second type of conditional expression is based on at least one state variable value S. As example, a conditional expression based on a state variable may be of the type «execute the action Ac if the temperature is below 19° C.». In the context of this second module type, the conditional expression may also comprise an activation time period. As example, such a conditional expression may be: «execute the action Ac if the temperature is below 19° C. between 10.00 am and 7.00 pm over the weekend».

The central control units U may have different support levels SL for the types of conditional expressions CE:

A full support of the conditional expression: evaluation of the conditions Cnd and triggering of the actions Ac;

A full support for the evaluation of the conditions Cnd;

A support for the evaluation of the conditions Cnd based on the state variables values S alone;

A support for the evaluation of the temporal conditions alone;

A support for the execution of the actions Ac alone;

A support for sending notification messages to the management unit Sv, indicating that the condition Cnd is met;

A support for sending control or notification messages to other central control units, capable of executing actions Ac. Advantageously, these messages and their addressees may be defined by the management unit Sv during the step of generating the software code module. In this case, the central control unit sending the control or notification message triggers the action without needing to know the attachment of the home automation devices or the action to execute;

No support at all.

This support level SL should be known by the server Sv in order to properly manage the evaluation of the condition Cnd and its effects as will be described subsequently. The support level is usually dependent on the type of central control unit and/or their software version.

The different elements of the conditional expression CE, namely the condition Cnd and the actions Ac, may be defined:

In the form of portions of an interpretable programming language;

In the form of a source code of a compilable programming language; an additional compilation step for the processor is necessary in this case;

In a pre-compiled form for a virtual machine; the virtual machine must be implemented on the entity Sv, U intended to execute the element and a loading of the element on the virtual machine must be performed prior to the execution;

In a binary or executable form, as a series of instructions in the machine language of the processor; in this case, the conversion tables may contain the source code which is compiled by the management unit Sv, for a processor intended to execute the code; the characteristics of the processor must be known in advance; in order to be able to execute this software code snippet, the entity that executes the code, for example the control unit U or the management unit Sv must beforehand possess the programming interface enabling the call of the generated code snippet. The generated binary/executable code may be integrated in the form of library(ies), in the software executable by the control unit U.

Figure 4:
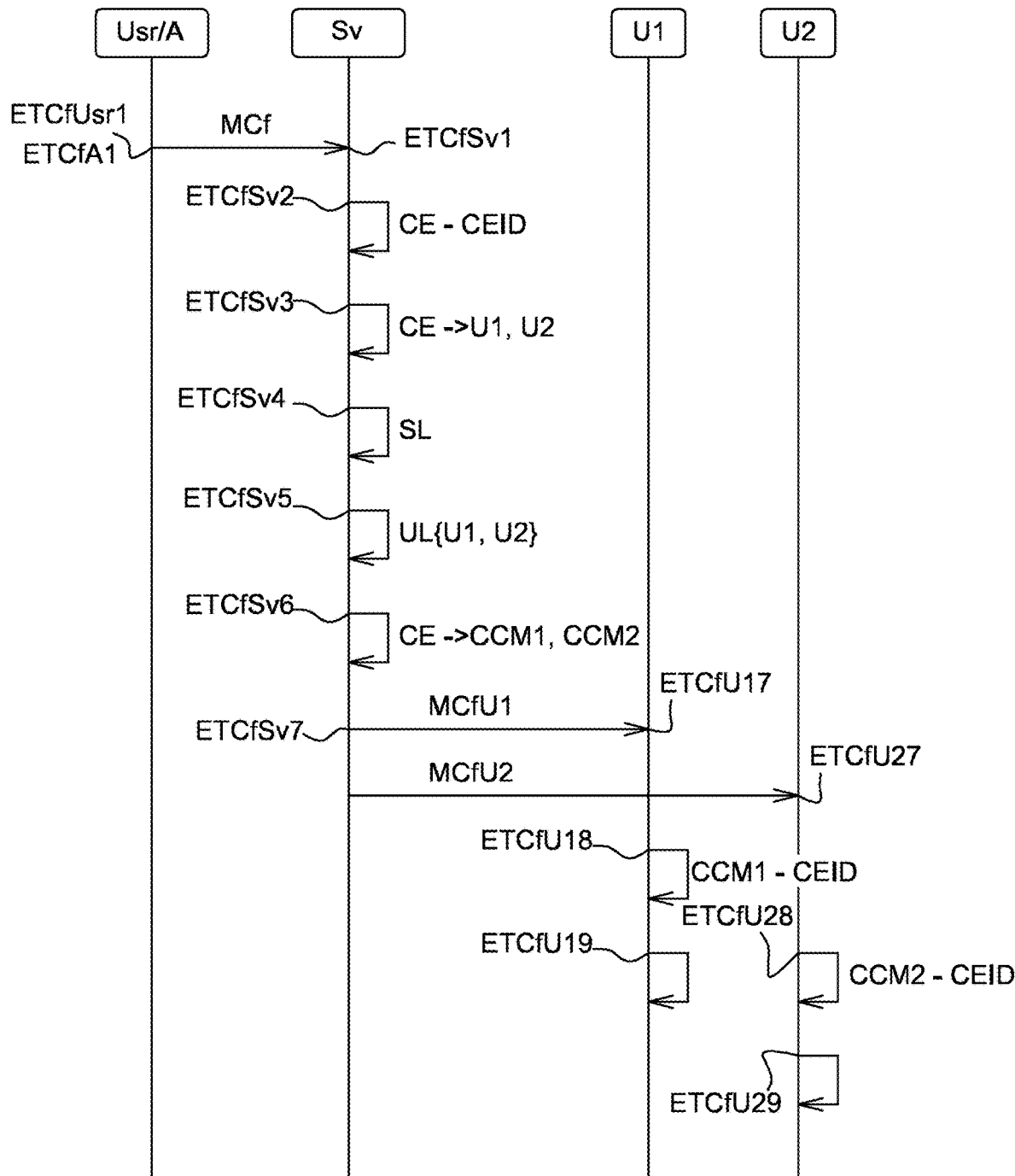
FIG. 4 is a diagram illustrating an implementation of a configuration method of a home automation installation according to the invention.

A configuration method of a home automation installation 17 of a building 1 executed by a server Sv connected to the at least one home automation installation 17 will now be described with reference to FIG. 4.

At a first step ETCfSv1, the server receives a configuration message MCf comprising a definition of a conditional expression CE originating from a user Usr or from an application A being executed on the server Sv or on another connected management unit. The conditional expression CE defines at least one evaluation of a condition Cnd covering at least one state variable S of at least one home automation device D and/or the time and/or the date, and at least one conditional triggering of at least one action Ac regarding at least one home automation device of the home automation installation.

Afterwards, at a step ETCfSv2, the conditional expression CE is saved on the server Sv in connection with a representative entity St of the installation 17. The definition of the conditional expression CE is always kept on the server in order to be referred to subsequently. This save is carried out in connection with a conditional expression identifier CEID.

In a subsequent phase of the method, the server Sv determines whether the conditional expression CE should be taken over on the server side or should be distributed, at least partially, over central control units U of the installation.

To this end, the server executes the following steps.

At a step ETCfSv3, the server determines the central control units U1, U2 involved in the conditional expressions CE and/or the actions.

In particular, the server Sv considers that a central control unit U1, U2 is involved if:

At least one of the state variables S of one of the home automation devices D related to said central control unit U1, U2 is used in the condition Cnd; or At least one of the home automation devices D related to said central control unit U1, U2 is used in an action Ac.

At a step ETCfSv4, for each selected central control unit U1, U2, the server determines the support level SL provided for the considered type of conditional expression CE.

At a step ETCfSv5, using the support level SL information, the server Sv selects the central control units U which are capable of participating in the management of the conditional expression CE in a list UL.

There are specific cases for which the conditional expression CE must be managed, at least partially, on the server side:

If the condition depends on values of state variables of devices related to distinct central control units considering that, according to one possibility, the central control units do not communicate with each other. In this case, the central control unit providing support for the evaluation of the condition Cnd sends to the server/to the management unit a notification message indicating that the condition is met or signaling a value change event for at least one of the state variables on which depends the condition. The server then propagates the state variable value change event or the met condition notification to the other central control units of the same installation.

According to another possibility, the central control units can communicate with each other. In this case:

the conditional software code module CCM1 generated by the management unit/server for the central control unit in charge of the evaluation of the condition comprises a definition of a notification or control message Mnc to be sent by this central control unit to another central control unit, in charge of the execution of the action; and the conditional software code module CCM2 generated by the management unit/server for the other central control unit, in charge of the execution of the action, comprises a definition of the action Ac to be executed on reception of the control or notification message.

If none of the involved central control units does provide support for the considered type of conditional expression CE, that is to say that the previous steps have not allowed selecting any central control unit U.

We may consider herein the following example. A conditional expression CE of the type «execution of the actions Ac if the temperature T1 is higher than 21° C.» is defined, the temperature T1 corresponding to a state variable S of a device D of the type temperature sensor related to a first central control unit U1. The actions Ac defined in this control module are:

AcU1: turning off a heating system, which is a home automation device related to the first central control unit U1;

AcU2: triggering a command on a set of external awnings which are home automation devices related to a second central control unit U2.

It arises that in this example, the first central control unit U1 is capable of evaluating the condition Cnd, as long as it has a sufficient support level for evaluating expressions based on state variables S. This control unit will be also capable of executing the action AcU1. Consequently, the evaluation of the condition and the realization of the action AcU1 may be assigned to said first central control unit. In contrast, the second action cannot be assigned to the first central control unit U1, but to the second central control unit U2. In this example, the central control units U1, U2 do not communicate with each other.

Based on these rules, the server carries out at a step ETCfSv6 a generation of at least one conditional software code module CCM. In particular, a conditional software code module is generated for each central control unit U1, U2 comprised in the list UL, each module being arranged to carry out the evaluation of the portion of the conditional expression CE assigned to the central control unit, and/or to trigger an action Ac and/or optionally to emit at least one notification to the management unit and/or another central control unit U, U1, U2. We will herein suppose that two conditional software code modules CCM1 and CCM2 are generated, respectively to the first central control unit U1 and to the second central control unit U2.

In a subsequent phase of the method, the server carries out a step ETCfSv7 of sending the at least one conditional software code module CCM1, CCM2 to the central control units U1, U2 selected during the above-described previous phase of the method, in a configuration message MCfU1, MCfU2, optionally in connection with a conditional expression identifier CEID.

At a step ETCfU17, the central control unit U1 receives the first conditional software code module CCM1.

Subsequently to the reception of this definition, the central unit U1 carries out the following steps.

At a step ETCfU18, the first central control unit U1 stores locally the definition of the conditional software code module CCM1 in connection with the identifier of the conditional expression CEID.

At a step ETCfU19, the first central control unit is configured to subsequently execute the conditional software code module CCM1, that is to say:

Re-evaluating locally the condition Cnd of the conditional expression CE when necessary, this expression may be based on a time counter or on values of state variables S relating to devices D related to the first central control unit U1, as in the above-mentioned example;

Executing a part of the actions of the conditional expression CE defined in the conditional software code module CCM1 when the condition Cnd is validated; the corresponding portion of the actions corresponds to the actions which apply to devices related to the central control unit U1; This corresponds to the action AcU1 in the above-mentioned example;

Notifying the server that the condition Cnd of the conditional expression CE comprised in the conditional software code module CCM1 has been validated and that the action(s) AcU1 have been triggered.

At a step ETCfU27, the second central control unit U2 receives the definition of the conditional software code module CCM2.

Subsequently to the reception of this definition, the central control unit U2 carries out the following steps.

At a step ETCfU28, the second central control unit U2 stores locally the definition of the conditional software code module CCM2 in connection with the identifier of the conditional expression CEID.

At a step ETCfU29, the central control unit U2 is configured to subsequently execute the conditional software code module CCM2, that is to say:

Executing a part of the actions of the conditional expression CE defined in the conditional software code module CCM2 when the condition Cnd is validated and that a message in that respect is communicated by the server Sv to the central control unit U2; the corresponding portion of the actions corresponds to the actions which apply to devices related to the central control unit U2; This corresponds to the action AcU2 in the above-mentioned example;

Notifying the server that the action AcU2 has been triggered.

According to several variants or implementation methods, the central control units U1, U2 may communicate with each other. In this case, the conditional expression CE may be managed differently. Recall that the conditional expression CE considered in the previous example is «execution of the actions AcU1 and AcU2 if the temperature T1 is higher than 21° C.»; the temperature T1 corresponds to a state variable S of a device D of the type temperature sensor related to a first central control unit U1, which is therefore capable of evaluating the condition Cnd. The actions Ac defined in this control module are:

AcU1: turning off a heating system, which is a home automation device related to the first central control unit U1, which is therefore capable of executing the action AcU1.

AcU2: triggering a command on a set of external awnings which are home automation devices related to a second central control unit U2, capable of executing the second action AcU2.

The conditional code module CCM1, CCM2 generated by the server will be different from those of the previous example as regards the transmission of the information that the condition Cnd is validated. Several implementation methods may be considered in this context.

According to a first implementation method, the code CCM1 intended to the first central control unit U1 contains, in addition to the instruction necessary to the evaluation of the condition Cnd and the execution of the action AcU1, instructions for sending a notification message directly to the second central control unit U2 in order to indicate that the condition Cnd of the conditional expression CE comprised in the conditional software code module CCM1 has been validate.

In this case, the code CCM2 intended to the second central control unit U2 contains instructions for the execution of the action AcU2, on reception of a notification message indicating that the condition Cnd is validated.

According to a second implementation method, the condition Cnd is met if the value of the state variable S is equal to a value V defined in the condition. The code CCM1 may comprise instruction for sending a notification message directly to the second central control unit U2 in order to explicitly indicate that the value of the state variable S is equal to V. This use case is particularly advantageous if the second central control unit U2 is capable of saving a scenario Scn which may be triggered if the value of the state variable S (in our example, the temperature) is equal to V.

The scenario Scn may be transmitted into the module CCM2 or saved beforehand in the second control unit U2. In this second assumption, it is not necessary to generate a specific conditional software code module CCM2.

According to a third implementation method, the code CCM1 intended to the first central control unit U1 contains instructions for sending an explicit control message to the second central control unit U2, for the execution of the action AcU2, for example «lower all the external awnings». In this case, it is not necessary to generate a specific conditional software code module CCM2.

It should be noted that in the three implementation methods described hereinabove, the generation of the conditional code modules CCM1, CCM2 by the server Sv, which has knowledge of the attachments of the devices to the control units, the functionalities of each control units, the commands and the parameters to send to each home automation device, allows using simpler, and therefore less expensive, control units.

A control method of an installation will now be described with reference to FIG. 5.

When the actions of the conditional expression CE cover multiple devices D related to multiple central control units U, the server may have to propagate the execution of these effects to the central control units which do not know the definition of the conditional expression CE.

In particular, the following situations should be considered:

The condition Cnd of the conditional expression is dependent on state variable S value: in this case, the condition Cnd will be evaluated only by the sole central control unit which possesses the definition of the conditional software code module CCM1. In the example hereinabove, the condition Cnd can be evaluated only by the first central control unit U1;

If the condition Cnd is only time-based, but some central control units do not provide support for the time-based conditional software code modules CCM.

In both cases, part of the effects should be propagated by the server to other central control units.

In the case considered in FIG. 5, we will suppose that the condition Cnd of the conditional expression covers a state variable S relating to a device D related to the central control unit U1, and that the triggered actions concern a home automation device related to the central control unit U2, based on the example of conditional expression CE described for the configuration method described with reference to FIG. 4.

At a step ETXU11, the central control unit U1 re-evaluates the condition Cnd as defined in the software code module CCM1, this condition may be based on a time counter or on values of state variables S relating to devices D related to the central control unit U1.

At a step ETXU12, when the condition Cnd is validated, the central control unit executes part of the actions AcU1 of the conditional expression CE defined in the conditional software code module CCM1, namely the actions which apply to devices related to the central control unit U1.

At a step ETXU13, the control unit U1 sends a notification NtU1 to the server Sv, for example in the form of a notification message MnU1 indicating that the condition Cnd of the conditional expression CE has been validated and optionally that its actions have been triggered, the server receiving this notification message at a step ETXSv3. The notification message comprises the identifier of the conditional expression CEID.

At a step ETXSv4, the server identifies the complete definition of the conditional expression CE stored beforehand thanks to the conditional expression identifier CEID provided in the notification message MN.

At a step ETXSv5, the server determines a selection of central control units XUL involved in the actions of the conditional expression CE alone. During this step, the central control unit U1 emitter of the notification NtU1 is excluded from the list. In the case of a condition Cnd of the conditional expression CE which would be only time-based, only the central control units that have no support for the evaluation of the time-based conditional expressions CE are kept in the selection.

At a step ETXSv6, the server then sends action messages Mac to the selected central control units in order to produce the remaining effects which have been configured in connection with this conditional expression CE. In the example illustrated in FIG. 5, an action message MAc is sent to the control unit U2 which receives it at a step ETXU26. The action message Mac may comprise the identifier of the conditional expression CEID.

At a step ETXU27, the central control unit U2 executes the action(s) AcU2 corresponding to the received action message, for example in connection with a home automation device D related thereto.

At a step ETXU28, the central control unit U2 sends a notification NtU2 in a notification message MNU2, in connection with the identifier of the conditional expression CEID in order to report on the progress of the action, the server receiving this notification message at a step ETXSv8.

At a step ETXSv9, the server determines the results of the actions of the conditional expression CE, by aggregating the notifications received in the different received notification messages MNU1, MNU2, based on the unique identifier of the conditional expression CEID. To this end, it is possible for example for the central unit U1 executing the evaluation of the condition Cnd to adjoin an execution identifier to the unique identifier of the conditional expression CEID in order to differentiate the different executions of this module, this execution identifier being propagated to the server and then to the other concerned central control units in the notification or action messages. Alternatively or complementarily, in the case of a temporal condition, a reference to the triggering time may be used to aggregate the results.

This result may be communicated or consulted by a user or by a third-party application at a step ETXUsr10, respectively ETXA10.

A variant of the control method of an installation will now be described with reference to FIG. 6. This variant corresponds to the case where the central control units communicate with each other. Only the differences with respect to the previous example will be detailed hereinafter.

The steps ETXU11' and ETXU12' are similar to the steps ETXU11 and ETXU12.

At a step ETXU13', the control unit U1 sends a notification NtU1 to the server Sv, for example in the form of a notification message MnU1 only indicating that its actions have been triggered, the server receiving this notification message at a step ETXSv3'. The notification message comprises the identifier of the conditional expression CEID.

At a step ETXU14', the first central control unit U1 sends a notification or control message Mnc to the central control unit U2 which receives it at a step ETXU24'. Depending on the use cases, this message comprises an indication that the condition Cnd is met, an indication that a change of the value of the state variable S has occurred, a execution request of a scenario or a command group identified by a scenario or command group identifier, or still explicitly a command or a group of commands to execute.

Subsequently, the steps ETXU27' and ETXU28' are similar to the steps ETXU27 and ETXU28 described in the implementation method of FIG. 5, as well as the next steps implemented by the server, ETXSv8' and following.

It should be noted that the server Sv is no longer involved in the evaluation of the condition Cnd or in the triggering of the actions AcU1, AcU2. Besides the already mentioned advantage, of distribution the computing load, this variant of the control method has the additional advantage of ensuring a proper operation of the installation even in the event of an Internet cut-off.

The server can always proceed with the aggregations of the execution notifications, as described in the previous example.

Figure 5:
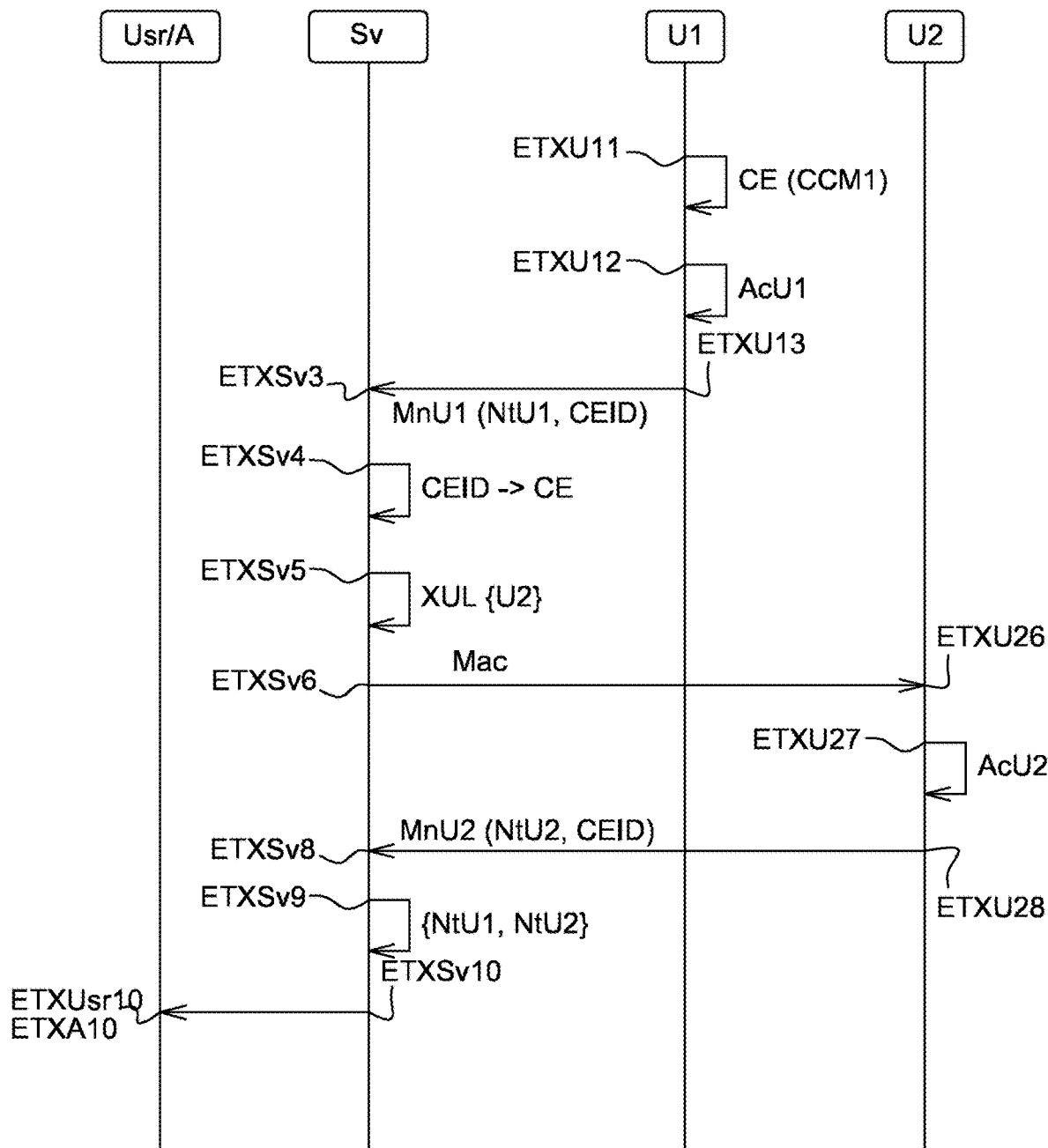
FIG. 5 is a diagram illustrating an implementation of a control method of a home automation installation according to the invention.
Figure 6:
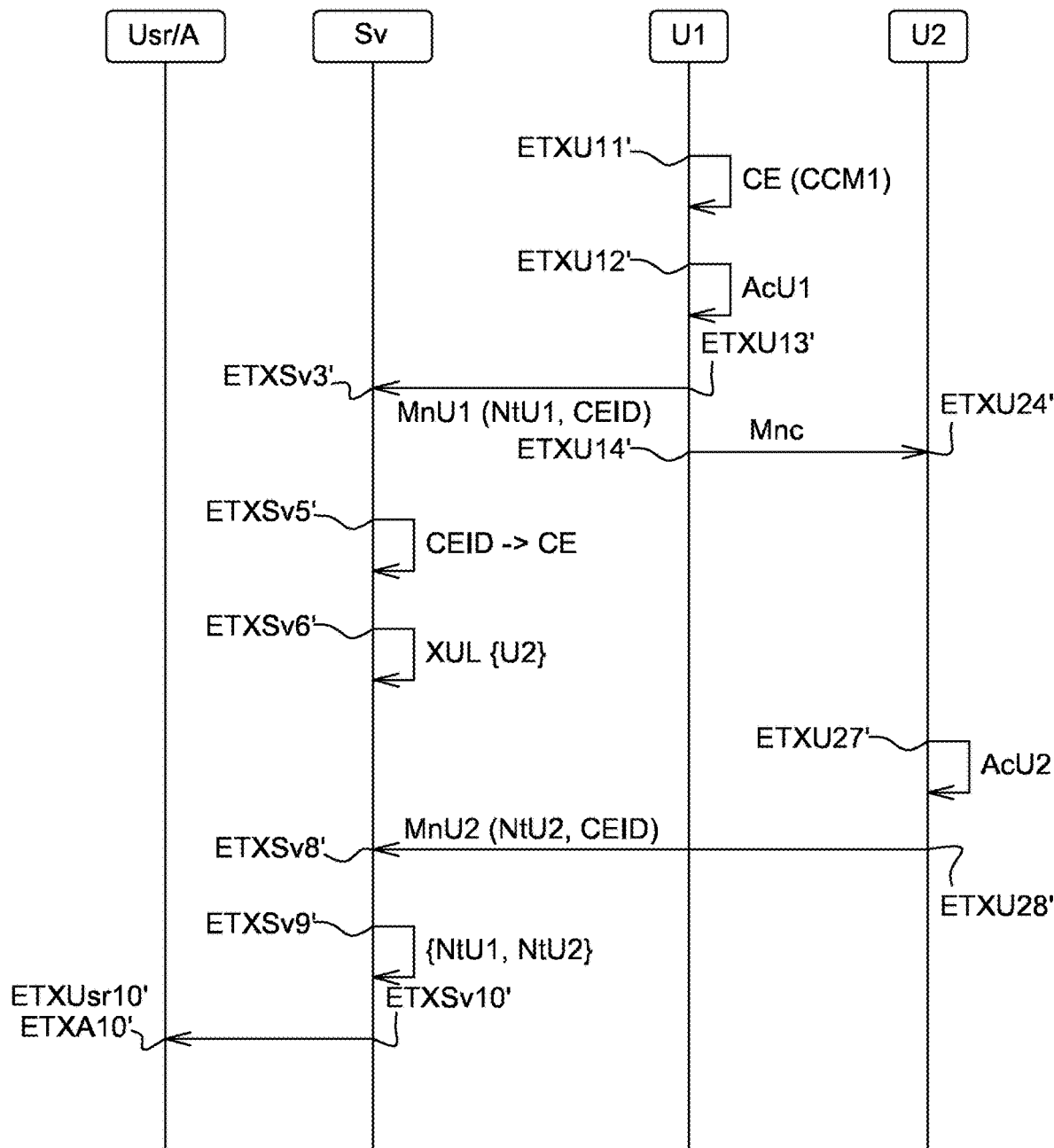
FIG. 6 is a diagram illustrating a second implementation of a control method of a home automation installation according to the invention.

In the method represented in FIG. 5 or in FIG. 6, the aggregation of the notification messages allows updating the data saved in the instance database IDB relating to the representative entity St. Thus, the Server has an up-to-date vision over the state of the home automation devices.

Thanks to these arrangements, a better user experience is obtained, because the server is capable of presenting the execution of the actions of the conditional expression CE as a unique coherent group of commands, in the same manner as would have been an immediate command execution, even though the latter has been divided and propagated throughout multiples central control units.

The invention claimed is:

1. A configuration method of a home automation installation, comprising a plurality of home automation devices and a plurality of central control units; the method being executed by a management unit or by a mobile terminal connected to the home automation installation and comprising the following steps:
   i. reception by the management unit of a configuration message originating from a user or an application being executed on the management unit or on another connected management unit, the message comprising a definition of a conditional expression from a user or from an application wherein the conditional expression defines at least:
      an evaluation of at least one condition covering at least one of:
         one state variable of at least one home automation device and/or
         one time or one date;
      and
      a conditional triggering of at least one action regarding at least one home automation device of the plurality of home automation devices of the home automation installation;
   ii. determination by the management unit of a list comprising at least one central control unit capable of managing at least one conditional expression and executing at least one of the following:
      evaluating the at least one condition; and
      triggering the at least one action;
   iii. generation by the management unit of at least one conditional software code module enabling, during its execution by the at least one central control unit included in the list, at least one of the following steps:
      the evaluation of the at least one condition; and
      the triggering of the at least one action;
      wherein each conditional software code module is arranged to execute at least one of the following:
      carry out the evaluation of a portion of the conditional expression assigned to the at least one central control unit;
      to trigger an action; and
      to emit at least one notification to at least one of the management unit and to another central control unit;
   iv. sending by the management unit to the at least one central control unit included in the list at least one configuration message comprising a definition of the at least one conditional software code module.

2. The configuration method according to claim 1, further comprising a step of saving the conditional expression in connection with a conditional expression identifier, and wherein the sending step of the at least one configuration message comprising the definition of the at least one conditional software code module is executed in connection with the conditional expression identifier.

3. The configuration method according to claim 2, wherein, the management unit determines that a central control unit is capable of evaluating the at least one condition or of executing the at least one action if:
   at least one of the state variables of one of the home automation devices related to said central control unit is used in the condition; or
   at least one of the home automation devices related to said central control unit is used in the at least one action.

4. The configuration method according to claim 2, further comprising a determination step of a support level provided by the at least one central control unit for a type of the conditional software code module; and wherein:
   the generation of the at least one conditional software code module is performed based on the support level.

5. The configuration method according to claim 1, wherein, the management unit determines that a central control unit is capable of evaluating the at least one condition or of executing the at least one action if:
   at least one of the state variables of one of the home automation devices related to said central control unit is used in the condition; or
   at least one of the home automation devices related to said central control unit is used in the at least one action.

6. The configuration method according to claim 5, further comprising a determination step of a support level provided by the at least one central control unit for a type of the conditional software code module; and wherein:
   the generation of the at least one conditional software code module is performed based on the support level.

7. The configuration method according to claim 1, further comprising a determination step of a support level provided by the at least one central control unit for a type of the conditional software code module; and wherein:
   the generation of the at least one conditional software code module is performed based on the support level.

8. The configuration method according to claim 7, being executed by a first central control unit of the plurality of central control units, wherein the configuration message comprises:
   a definition of at least one notification or control message; and at least one identifier of a second central control unit of the plurality of central control units of the home automation installation, and wherein the first central control unit is configured so as to send the notification or control message to the second central control unit, when the at least one condition has been validated.

9. A control method of a home automation installation, the home automation installation comprising a plurality of home automation devices, and a plurality of central control units; the method being executed by a management unit or by a terminal connected to the home automation installation, and comprising the following steps:
implementation of the configuration method of claim 1;
  i. reception by the management unit of a notification message originating from an emitter central control unit indicating that the at least one condition of the conditional expression has been validated and/or that the at least one action has been executed;
  ii. identification of a complete definition of the conditional expression;
  iii. determination of a selection of central control units of the plurality of central control units involved in the at least one action of the conditional expression;
  iv. sending at least one action message to at least one central control unit of the plurality of central control units comprised in the selection for triggering an action on a home automation device related to said central control unit.

10. The control method according to claim 9, wherein the notification message received at step i provides an identifier of the conditional expression; and wherein a complete definition of the conditional expression is stored beforehand in connection with the identifier, the identification of a complete definition of the conditional expression may be carried out thanks to the identifier of the conditional expression provided in the notification message.

11. The control method according to claim 10, wherein the action message sent at step iv comprises the identifier of the conditional expression, the method further comprising the following step:
determination of a result of the at least one action, by aggregating a plurality of notifications received in a plurality of received notification messages, based on the identifier of the conditional expression.

12. A non-transitory computer readable medium comprising code instructions arranged to implement the steps of a method according to claim 1, when the code instructions are executed by a processor of the management unit or of the at least one central control unit.

13. A system comprising a management unit or a mobile terminal arranged to execute the method according to claim 1, connected to at least one central control unit of the plurality of central control units of a home automation installation, the at least one central control unit of the plurality of central control units being arranged to execute a configuration method of a home automation installation, the configuration method comprising the following steps:
  i. reception by the management unit of a configuration message originating from a management unit or from a mobile terminal connected to the home automation installation, the configuration message comprising a definition of a conditional software code module enabling during its execution, wherein the conditional expression defines at least:

an evaluation of at least one condition covering at least one of:
  one state variable of at least one home automation device related to the at least one central control unit and/or
  one time or one date;
and/or
  a conditional triggering of at least one action regarding at least one central control unit of the plurality of central control units;
  ii. saving the conditional software code module;
  iii. configuration of the at least one central control unit of the plurality of central control units so as to:
    evaluate the at least one condition; and/or
    trigger the at least one action when the at least one condition is validated subsequently to the evaluation.

14. A configuration method of a home automation installation, comprising a plurality of home automation devices and a plurality of central control units; the method being executed by at least one central control unit of the plurality of central control units and comprising the following steps:
  i. reception by the at least one central control unit of the plurality of central control units of a configuration message originating from a management unit or from a mobile terminal connected to the home automation installation following the reception of a configuration message originating from a user of an application being executed on the management unit or on another connected management unit, the configuration message comprising a definition of a conditional software code module, wherein the configuration message defines at least:
    an evaluation of at least one condition covering at least one of:
      one state variable of at least one home automation device related to the at least one central control unit of the plurality of central control units and/or
      one time or one date;
    and/or
      a conditional triggering of at least one action regarding at least one home automation device of the plurality of home automation devices of the home automation installation, the conditional software code module being generated by the management unit of by the mobile terminal connected to the home automation installation;
  ii. saving the conditional software code module;
  iii. configuration of the at least one central control unit of the plurality of central control units so as to:
    evaluate the at least one condition; and/or
    trigger the at least one action when the at least one condition is validated subsequently to the evaluation of the at least one condition.

15. The configuration method according to claim 14, wherein the at least one central control unit of the plurality of central control units is configured so as to send a notification message to the management unit or the mobile terminal indicating that the at least one condition has been validated and/or that the at least one action has been triggered.

16. The configuration method according to claim 14, being executed by a first central control unit, wherein the configuration message comprises:

a definition of at least one notification or control message; and at least one identifier of a second central control unit of the of the plurality of central control units of the home automation installation, and wherein the first central control unit is configured so as to send the notification or control message to the second central control unit, when the at least one condition has been validated.

17. A control method of a home automation installation, the home automation installation comprising a plurality of home automation devices, and a plurality of central control units; the method being executed by at least one central control unit of the plurality of central control units, the method comprising the following steps:
  implementation of the configuration method of claim 14;
    i. evaluation of the at least one condition; and/or
    ii. execution of the at least one action defined by the conditional software code module.

18. The control method according to claim 17, wherein the conditional software code module is saved beforehand in connection with a conditional expression identifier; and
  further comprising a step of sending a notification message to a management unit indicating that the at least one condition of the conditional software code module has been validated during its evaluation and/or that the at least one action has been executed, in connection with the conditional expression identifier.

19. The control method according to claim 18, wherein a first central control unit of the plurality of central control units has been configured beforehand to carry out the evaluation of the at least one condition, the method further comprising a step of sending a notification or control message to a second central control unit of the plurality of central control units by the first central control unit, when the at least one condition has been validated by the first central control unit of the plurality of central control units.

20. The control method according to claim 17, wherein a first central control unit of the plurality of central control units has been configured beforehand to carry out the evaluation of the at least one condition, the method further comprising a step of sending a notification or control message to a second central control unit of the plurality of central control units by the first central control unit, when the at least one condition has been validated by the first central control unit.

* * * * *